UNITED STATES PATENT OFFICE.

JEAN ALTWEGG AND JOANNY LANDRIVON, OF LYON, FRANCE, ASSIGNORS TO SOCIETE CHIMIQUE DES USINES DU RHONE (ANCIENNEMENT GILLIARD, P. MONNET ET CARTIER), OF PARIS, FRANCE.

BETA-HALOGEN-ETHYLAMINOBENZOIC ESTERS AND THEIR DERIVATIVES.

1,334,641.   Specification of Letters Patent.   Patented Mar. 23, 1920.

No Drawing.   Application filed June 13, 1919.   Serial No. 303,973.

*To all whom it may concern:*

Be it known that we, JEAN ALTWEGG, of 227$^{bis}$ Avenue de Saxe, Lyon, France, a citizen of the Confederation of Switzerland, and JOANNY LANDRIVON, of 22 Rue de l'Annonciade, Lyon, France, a citizen of the Republic of France, have invented a certain new and useful Beta-Halogen-Ethylaminobenzoic Esters and Other Derivatives, of which the following is a specification.

This invention has for its object the manufacture of the β-halogen-ethylaminobenzoic esters having for general formula

where R represents an alkyl radical and $x$ a halogen.

According to this invention the β-halogenethyl-aminobenzoic esters can be obtained by treating β-oxyethylaminobenzoic esters having the general formula

with halogenating reagents such as phosphorus or sulfur halides, thionyl chlorid or bromid or the like. The new esters are stable products and can be distilled under reduced pressure without decomposition.

Example 1. A solution of 20 parts of ethyl β-oxyethylparamino-benzoate having the formula

and melting at 63° C. in 15 parts of benzene free from moisture is poured into a mixture of 20 parts of phosphorus pentachlorid and of 25 parts of benzene free from moisture. The reaction is completed by heating on the water bath. The benzene and the phosphorus oxychlorid are eliminated by evaporation and the residue is purified by distillation under reduced pressure. In this manner, ethyl β-chlorethyl-paraminobenzoate having for formula

is obtained in the form of a crystalline substance of melting point 69° C. and boiling point 183° C. at 3 mm. of mercury.

Example 2. Ethyl β-oxyethyl-p-aminobenzoate is dissolved in an equal molecular proportion of dimethylanilin, and an equal molecular proportion of thionyl chlorid is run into the solution while cooling. The mixture is heated for a while on the water bath and then treated with lukewarm water. The dimethylanilin hydrochlorid dissolves while the ethyl β-chlorethylparamino-benzoate separates in granules. The product is purified by washing with water and by distilling under reduced pressure. The yields are approximately in agreement with theory.

The products forming the subject matter of this invention are useful as local anesthetics, and as raw material for preparing other pharmaceutical products.

It is understood that the above examples are given by way of illustrative examples only, and may be varied in details according to the particular reagents employed.

What we desire to claim and secure by Letters Patent is:—

The new industrial products, the β-halogen-ethylaminobenzoic esters which may be obtained by the above described process, being stable products which can be distilled under reduced pressure without decomposition.

In witness whereof we have hereunto signed our names in the presence of two subscribing witnesses.

JEAN ALTWEGG.
J. LANDRIVON.

Witnesses:
MARIN VACHON,
LOUIS ERCHET.